United States Patent [19]
Isobe et al.

[11] Patent Number: 5,144,612
[45] Date of Patent: Sep. 1, 1992

[54] DISC LOADING DEVICE

[75] Inventors: Nobuyuki Isobe; Isao Watanabe, both of Saitama, Japan

[73] Assignee: Pioneer Electronic Corporation, Tokyo, Japan

[21] Appl. No.: 344,794

[22] Filed: Apr. 28, 1989

[30] Foreign Application Priority Data

Jul. 28, 1988 [JP] Japan .................. 63-186838

[51] Int. Cl.$^5$ .................................. G11B 17/04
[52] U.S. Cl. .................. 369/77.1; 369/75.2
[58] Field of Search ............ 369/77.1, 75.1, 75.2

[56] References Cited

U.S. PATENT DOCUMENTS

| | | | |
|---|---|---|---|
| 4,592,039 | 5/1986 | Toyoguchi et al. | 369/75.2 |
| 4,692,916 | 9/1987 | Rouws | 369/75.2 |
| 4,701,902 | 10/1987 | Aoyagi et al. | 369/77.1 |
| 4,764,917 | 8/1988 | Sugihara et al. | 369/77.1 |

Primary Examiner—William M. Shoop, Jr.
Assistant Examiner—John W. Cabeca
Attorney, Agent, or Firm—Sughrue, Mion, Zinn, Macpeak & Seas

[57] ABSTRACT

A disc loading device loads a disc in position on a turntable for reading information on either face of the disc. A clamp plate having one disc centering member clamps the disc to the turntable having a second disc centering member. The centering member corresponding to the disc face to be read is used to center the disc. The clamp and a carriage are driven in synchronism through a slider plate having multiple cam portions and which is adapted to move only horizontally under control of a motor, gear, track, horizontal slots on a fixed plate, and pins which are attached to the track and a fixed plate and pass thru the horizontal slots. As the motor rotates, its direction and amount of rotation is transferred to movement of the slider plate. Cam slots on the slider plate receive pins connected to the carriage and the clamp member, the latter pins passing through vertical slots in the fixed plate such that horizontal movement of the slider plate causes vertical movement of the carriage and clamp member. In this way, the motor direction and rotational angle causes relative vertical movement of the carriage and the clamp member to cause the same to clamp the disc to the turntable. The two centering members respond to the vertical position of the clamp member to determine which centering member centers the disc.

7 Claims, 21 Drawing Sheets

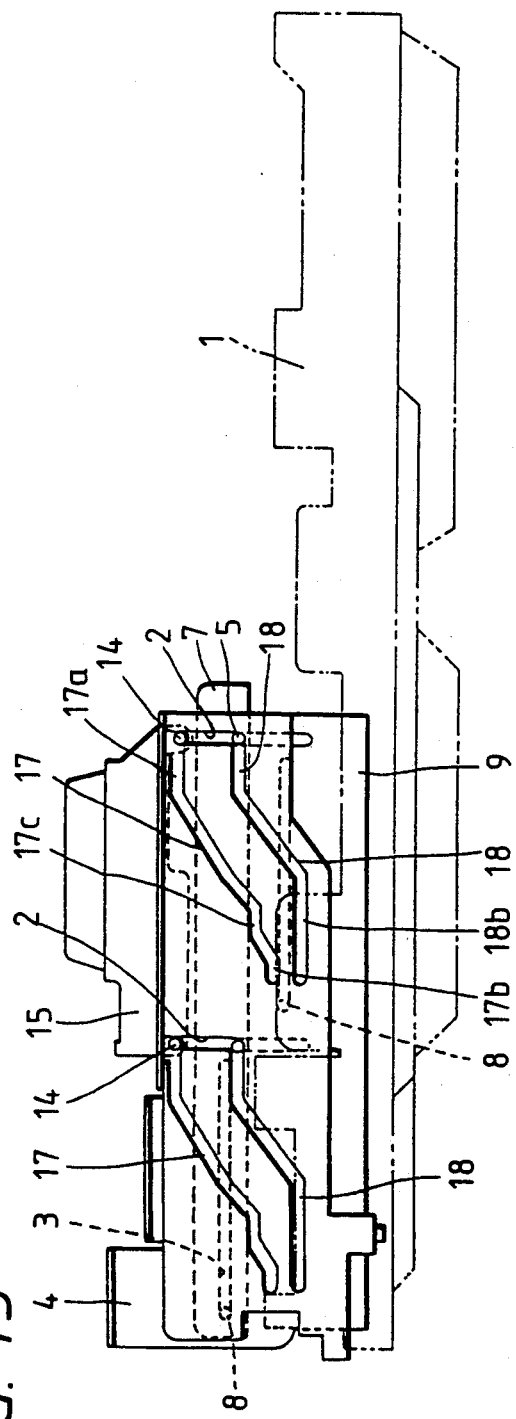
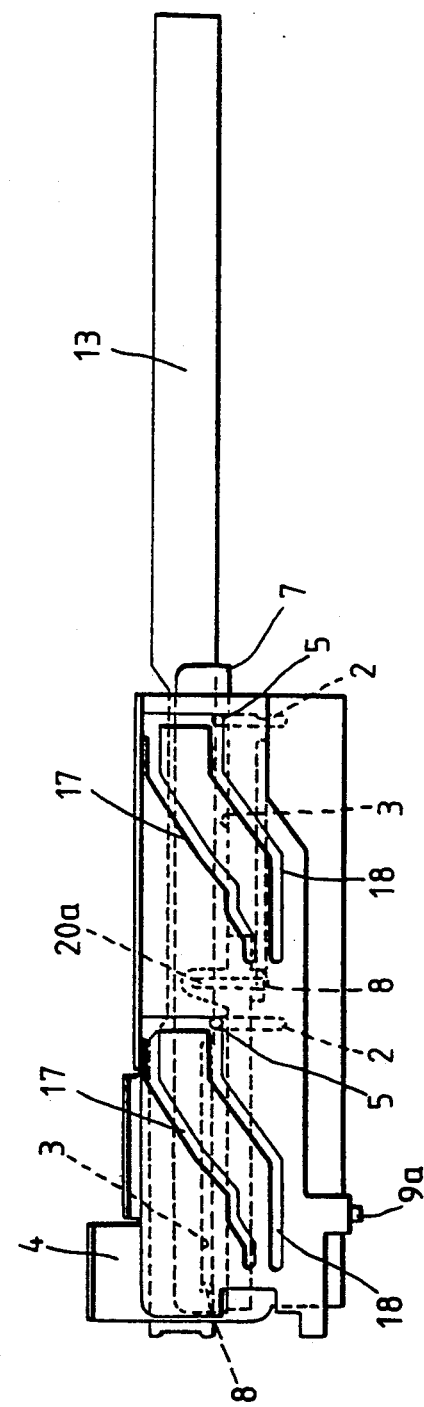

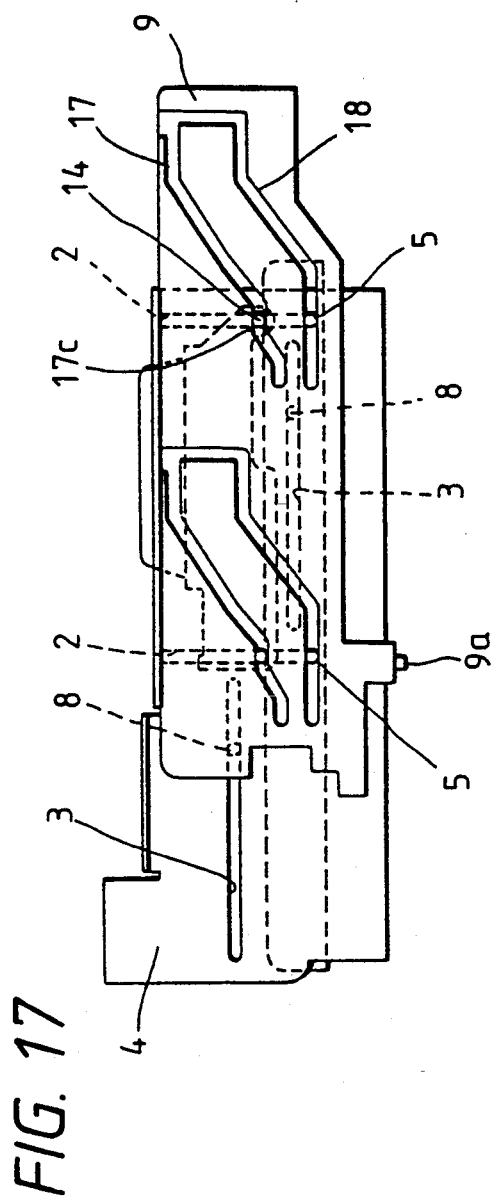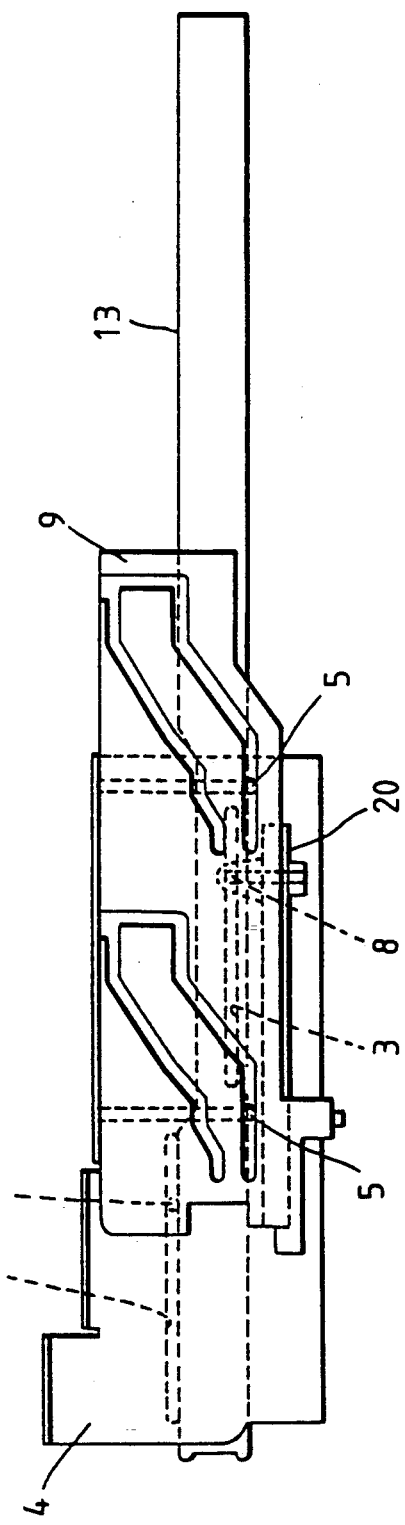

DISC LOADING DEVICE

BACKGROUND OF THE INVENTION

1. Field of Invention

This invention relates to an improved disc loading device for setting a video disc (also referred to as a laser disc and composed of two discs or disc elements bonded together) on a turntable so that upper and lower recording/reproducing faces of the disc can be reproduced, respectively.

2. Prior Art

In conventional disc loading devices of this type, when reading the information on either of the upper and lower faces, a centering member is inserted into a centering hole formed through the lower one of the two bonded discs so as to center the disc.

PROBLEMS TO BE SOLVED BY THIS INVENTION

However, when the upper disc is to be read (hereinafter sometimes referred to as "reproduced"), the upper disc is centered through the lower disc and therefore if the two bonded discs are out of alignment with each other, signal errors are reproduced by an eccentric rotation of the disc.

This results in the drawbacks that tracking errors develop to adversely affect the picture quality and that a tracking follower mechanism is subjected to a premature wear.

SUMMARY OF THE INVENTION

With the above deficiencies of the prior art in view, it is an object of this invention to provide a disc loading device in which when reading the upper disc, the center hole of the upper disc is utilized, and when reading the lower disc, the center hole of the lower disc is utilized, and the disc is set on the turntable by operating one slide plate, thereby simplifying the mechanism.

The above object has been achieved by a disc loading device which comprises a carriage movable downwardly to transfer the disc to a turntable therefrom, and a clamp plate which has a clamper for urging the thus transferred disc against the turntable, the clamp plate having a centering member for centering the disc, using a center hole of an upper disc thereof. The carriage and the clamp plate are operated through two cam slots formed in one slide plate.

In the disc loading device according to the present invention, the carriage is moved downwardly by operating the slide plate, and the disc placed on the carriage is transferred to the turntable therefrom, and at the same time the clamp plate is moved downwardly, so that its clamper urges or presses the disc against the turntable.

As a result, the centering member mounted on the turntable is inserted in the center hole of the disc, so that the disc is rotated about the center hole of the lower disc. Therefore, when reproducing the information on the lower disc, the lower disc can be rotated without being subjected to eccentricity.

For reproducing information on the upper disc, the slide plate is further operated to further move the clamp plate downwardly.

During such downward movement, the clamper is kept pressed against the disc, but the centering member mounted on the turntable is forced out of the center hole of the lower disc, and instead the centering member mounted on the clamper is inserted in the center hole of the upper disc to thereby center the upper disc. Therefore, when reproducing the upper disc, the upper disc can be rotated without it being subjected to eccentricity.

Thus, in the present invention, by operating one slide plate, the transfer of the disc, the clamping of the disc and the non-eccentric rotation of the disc for reproducing either face of the disc can be achieved.

BRIEF DESCRIPTION OF THE DRAWINGS

FIG. 15 is a side-elevational view showing the position of a clamp plate 15 when the gear drive mechanism is in the condition of FIG. 7;

FIG. 16 is a side-elevational view showing the position of the carriage 13 when the gear drive mechanism is in the condition of FIG. 7;

FIG. 17 is a side-elevational view showing the clamp plate 15 at the time of effecting a face A-clamping in connection with FIG. 16;

FIG. 18 is a view showing the same condition of FIG. 17 but showing the position of the carriage 13;

DETAILED DESCRIPTION OF THE PREFERRED EMBODIMENT

Figure 1:
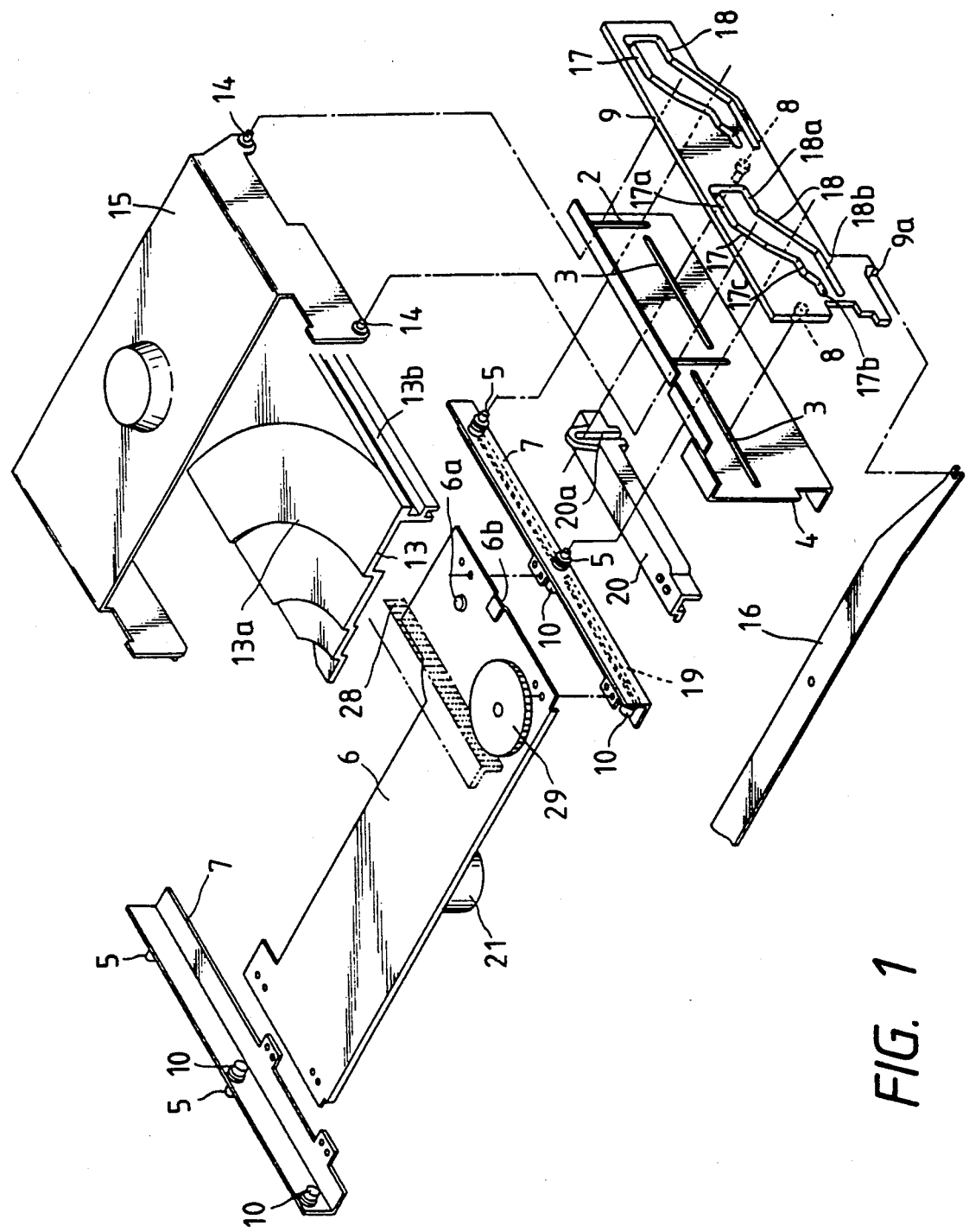
FIG. 1 is an exploded perspective view of a portion of the preferred embodiment of the invention.

A preferred embodiment of the present invention will now be described with reference to FIGS. 1 to 30.

A pair of right and left upstanding side plates 4 are connected to right and left sides of a chassis 1, respectively, each of the side plates 4 having two vertical guide slots 2 and two horizontal guide slots 3.

A pair of pins 5 are received respectively in the two vertical guide slots 2 of each of the right and left side plates 4 so that the pair of pins 5 are slidingly movable along the two vertical guide slots 2, respectively. A pair of slide frames 7 are fixedly secured to right and left sides of a motor mounting plate 6, and the inner ends of each pair of pins 5 are fixedly secured to a respective one of the slide frames 7.

Also, a pair of pins 8 are received respectively in the two horizontal guide slots 3 of each of the right and left side plates 4 so that the pair of pins 8 are slidingly movable along the two horizontal guide slots 3, respectively. A pair of right and left slide plates 9 are disposed outside the pair of side plates 4, respectively and the outer ends of each pair of pins 8 are fixedly secured to a respective one of the slide plates 9.

Therefore, the motor mounting plate 6 is movable upwardly and downwardly relative to the side plates 4, and the slide plates 9 are movable forwardly and backwardly relative to the side plates 4.

Each of the right and left slide frames 7 has a pair of rollers 10 mounted thereon and directed inwardly, and the two pairs of rollers 10 on the right and left slide frames 7 are received respectively in a pair of guide grooves 13b formed in opposite sides of a carriage 13. The carriage 13 has concentrically-arranged stepped portions 13a on which a video disc 11 and a compact disc 12 can be placed in a concentric manner.

Therefore, the carriage 13 is movable forwardly and backwardly relative to the motor mounting plate 6.

In addition to the pins 5, another pair of pins 14 are slidably received respectively in the two vertical guide slots 2 of each of the two side plates 4, and the inner ends of the pins 14 are fixedly secured to a clamp plate 15. Therefore, the clamp plate 15 is slidable upwardly and downwardly relative to the chassis 1.

The pair of right and left slide plates 9 each has a projection 9a at its lower surface, and the projections 9a on the right and left slide plates 9 are received in grooves 16a formed in opposite ends of a lever 16, the lever 16 being pivotally connected at its center to the chassis 1.

Therefore, when one of the slide plates 9 is moved forwardly, the other is moved backwardly. Thus, the two slide plates 9 are movable in an opposite manner.

One of the slide plates 9 has a pair of cam slots 17 and a pair of cam slots 18. Each cam slot 17 has horizontal portions 17a, 17b and 17c at its opposite ends and intermediate the opposite ends, and each cam 18 has horizontal portions 18a and 18b at opposite ends thereof.

The other slide plate 9 also has a pair of similar cam slots 17 and a pair of similar cam slots 18. The other slide plate 9 is designed to move in a direction opposite to the direction of movement of the one slide plate 9, and therefore the direction of inclination of the cam slots 17 and 18 of the other slide plate 9 is opposite to the direction of inclination of the cam slots 17 and 18 of the one slide plate 9.

The pins 5 of each slide frame 7 extend through the respective vertical guide slots 2 of its mating side plate 4 and are received in the respective cam slots 18 of its mating slide plate 9, and each pair of pins 14 on the clamp plate 15 extend through the respective vertical guide slots 2 and are received in the respective cam slots 17.

The slide frame 7 has a guide slot 19 extending along the length thereof, and a rack member 20 is mounted on the slide frame 7 so as to be movable along the guide slot 19. One of the pins 8 of the slide plate 9 extends through the horizontal guide slot 3 and is received in a vertical groove 20a of the rack member 20.

Therefore, the slide plate 9 is horizontally moved in response to the horizontal movement of the rack member 20.

A motor 21 is mounted on the lower surface of the motor mounting plate 6, and the motor 21 drives a gear 24, rotatably mounted on the shaft 23 mounted on the lower surface of the motor mounting plate 6, through a series of gears 22.

The gear 24 has a boss 24a on which another gear 25 is rotatably mounted.

The gear 25 has a hole 25a in which a ball 26 is received, and the ball 26 is adapted to lie on a cam surface 24c of the gear 24, the cam surface 24c having stepped portions 24b.

When the ball 26 lies on the cam surface 24c, the ball 26 projects upwardly beyond the upper surface of the gear 25, but when the ball 26 lies on a lower surface 24d formed as a result of the provision of the stepped portions 24b, the ball 26 is disposed at a level lower than the upper surface of the gear 25.

The motor mounting plate 6 has a recessed portion 6a for receiving the thus projected ball 26 therein.

Figure 2:
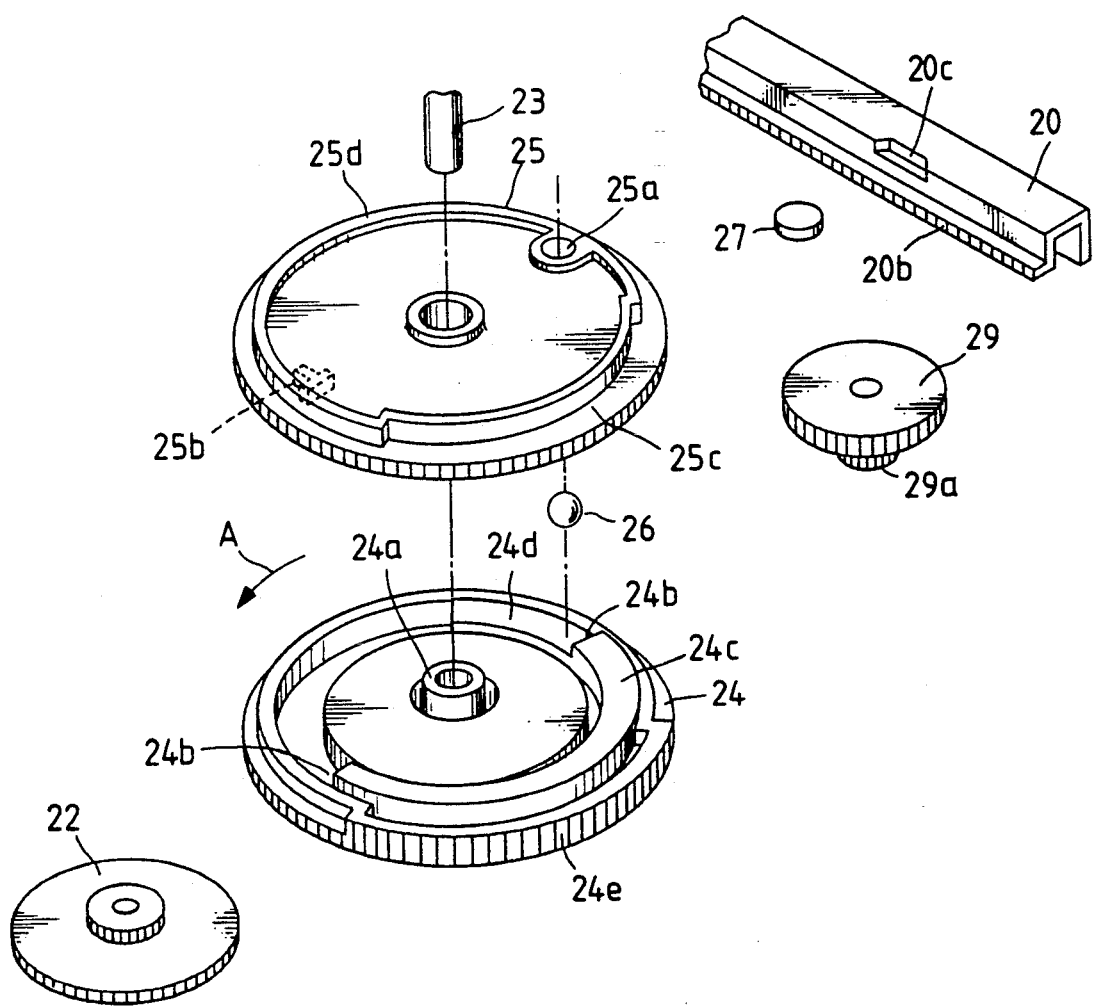
FIG. 2 is an exploded perspective view of a gear drive mechanism.
Figure 3:
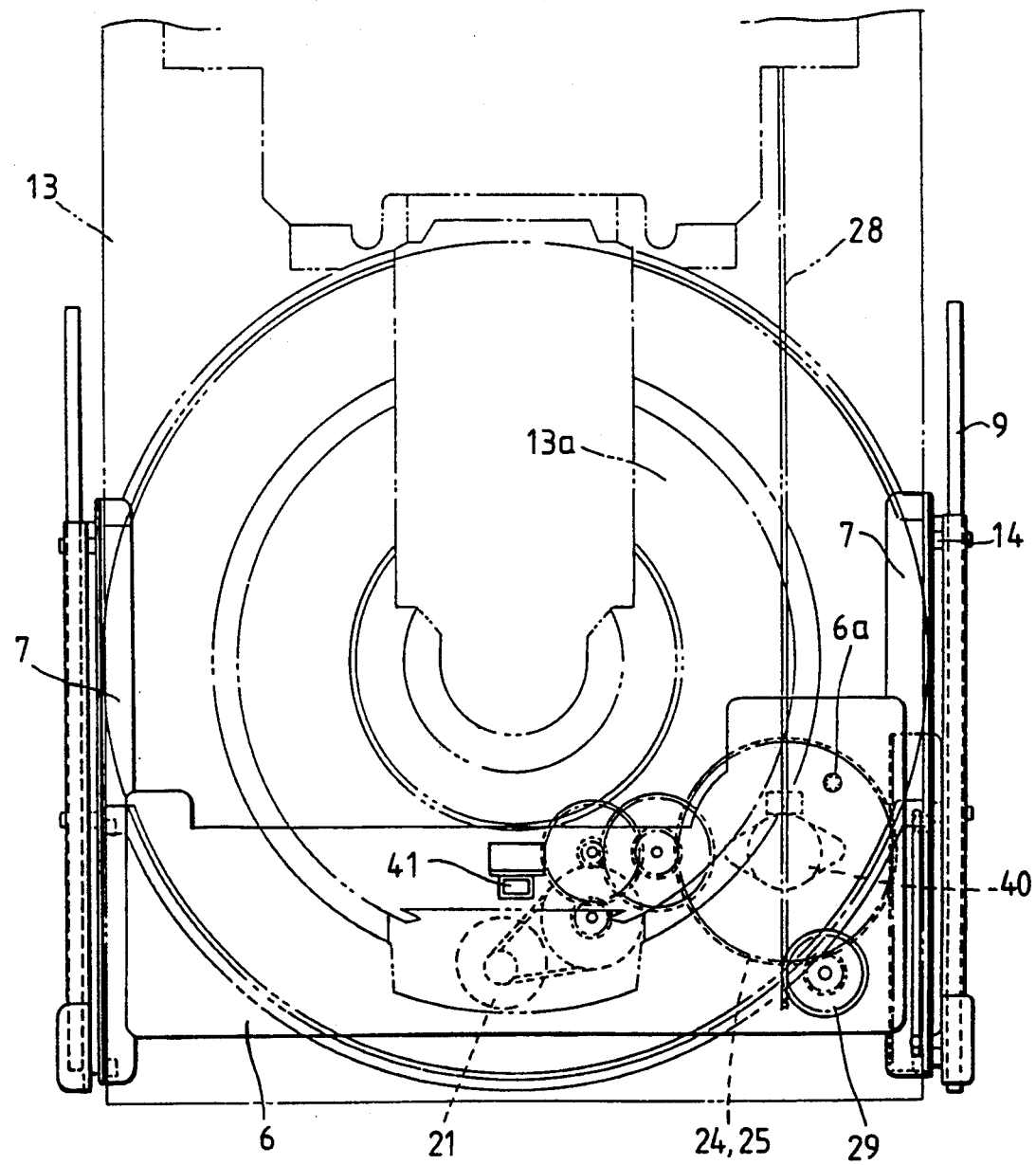
FIG. 3 is a plan view.
Figure 4:
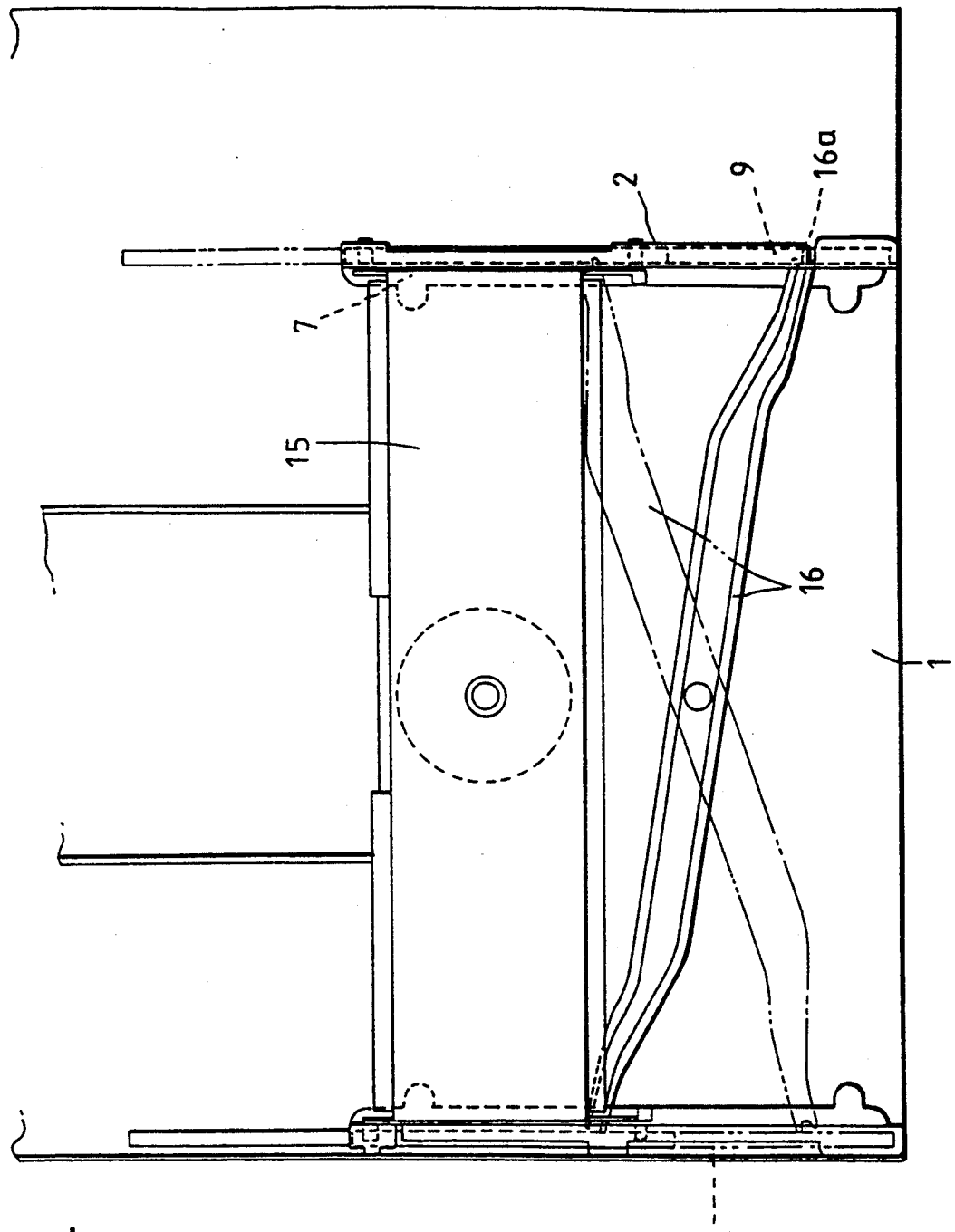
FIG. 4 is a plan view of a lower portion of FIG. 3, showing the operation of a lever in a dots-and-dash line.
Figure 5:
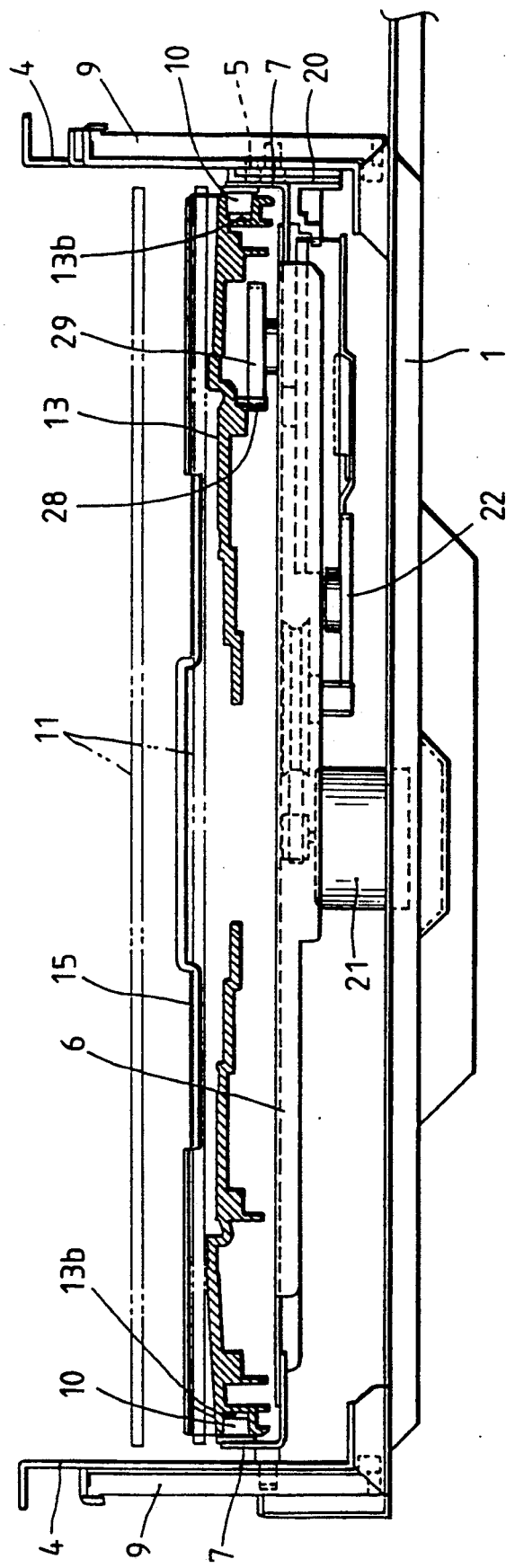
FIG. 5 is a front-elevational view.

The gear 25 has a projection 25b formed at its lower surface, and the projection 25b is engaged with the stepped portion 24b of the gear 24 to rotate the gear 25 together with the gear 24, when the gear 24 rotated in a direction opposite to the direction of an arrow A (FIG. 2).

Further, the gear 24 has a gear portion at its periphery, and this gear portion has a wider gear portion 24e which is meshingly engageable with the rack 20b of the rack member 20.

The gear 25 has at its upper side a cam surface 25d which has a recessed portion 25c. A roller 27 is interposed between the cam surface 25d and a recess 20c in the rack member 20.

The roller 27 is supported by a stamped portion 6b of the motor mounting plate 6, and is movable only in a direction perpendicular to the rack member 20.

Therefore, when the cam surface 25d is in contact with the roller 27, part of the roller 27 is received in the recess 20c in the rack member 20 to thereby prevent the rack member 20 from movement in forward and backward directions.

However, when the recessed portion 25c is brought into registry with the roller 27, the roller 27 is moved out of the recess 20c toward the gear 25, thereby allowing the movement of the rack member 20 in the forward and backward directions.

A gear 29a is disposed coaxially with a gear 29 in mesh with a rack 28 of the carriage 13, and the gear 29a is in mesh with the gear 25, and therefore when the gear 25 rotates, the carriage 13 is driven for movement in a forward or a backward direction.

Figure 6:
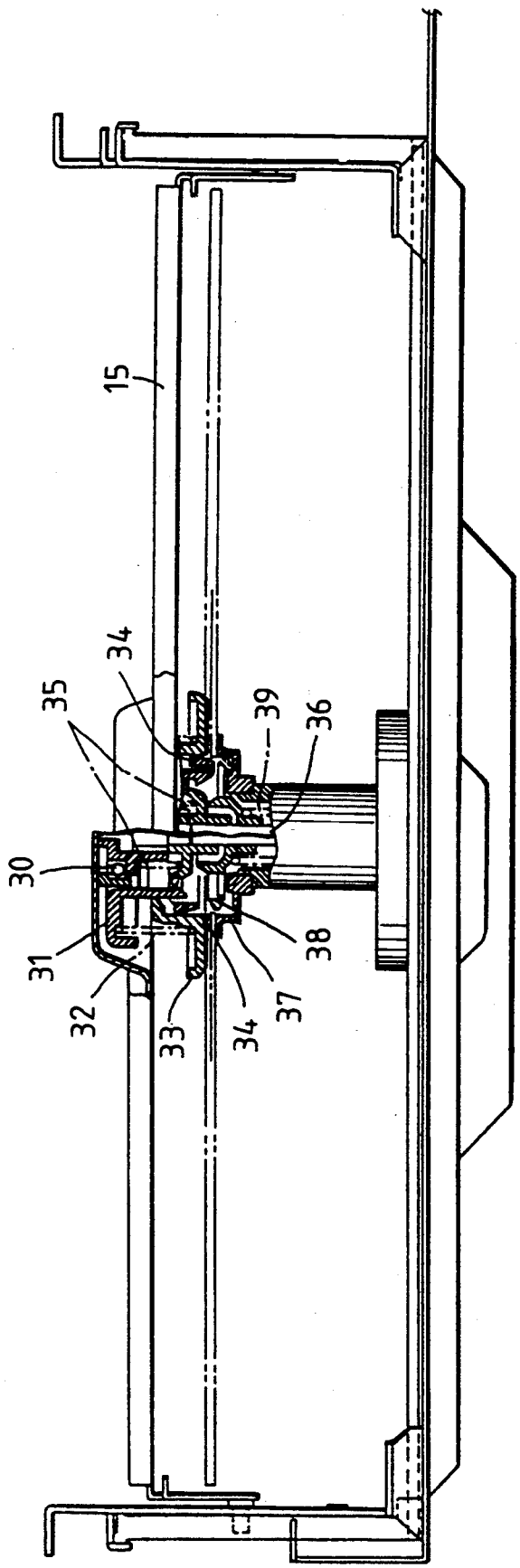
FIG. 6 is a cross-sectional view through a central portion of a turntable, a left half portion thereof showing the condition in which a clamp plate is in its upper position while a right half portion shows a face B-clamping.
Figure 7:
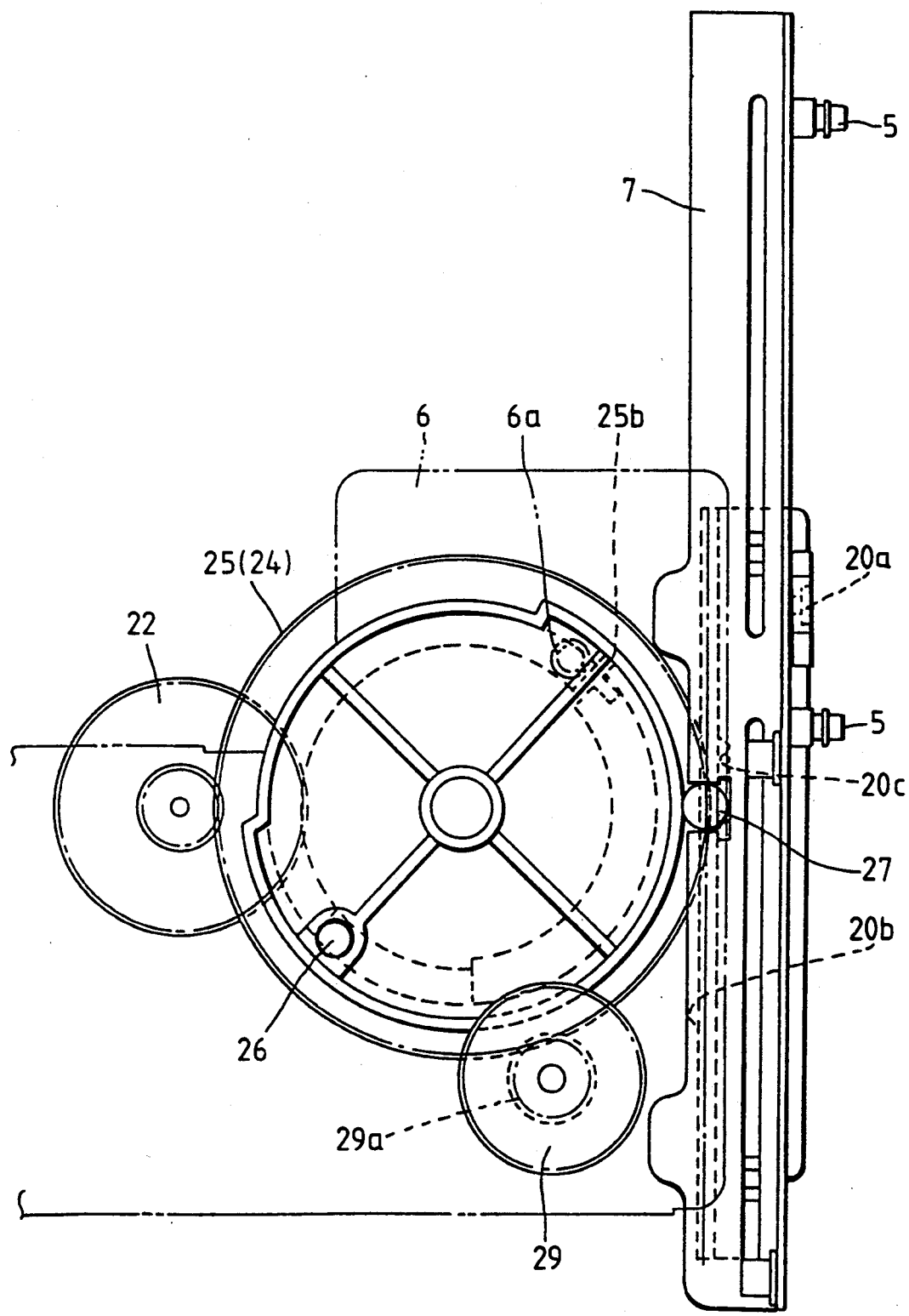
FIG. 7 is a plan view of the gear drive mechanism in position (I)
Figure 8:
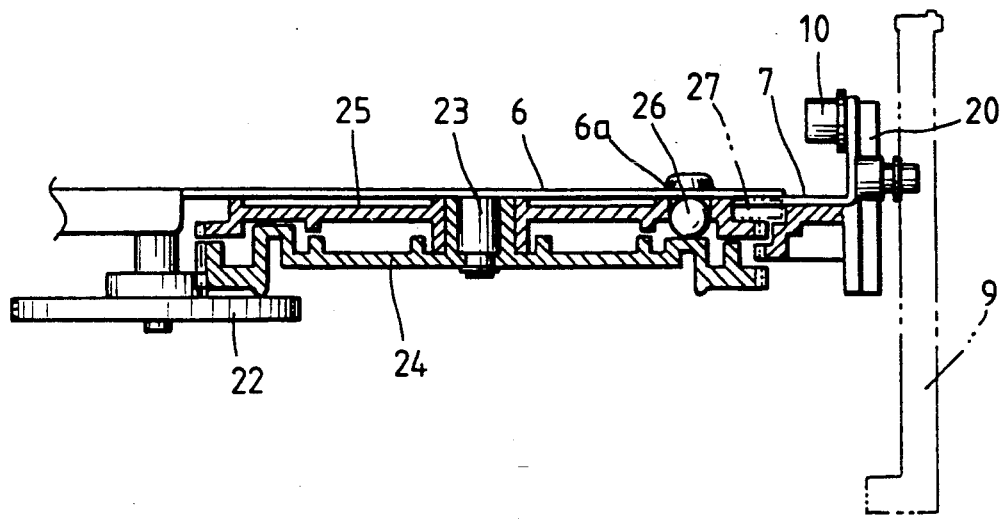
FIG. 8 is a cross-sectional view of FIG. 7.
Figure 10:
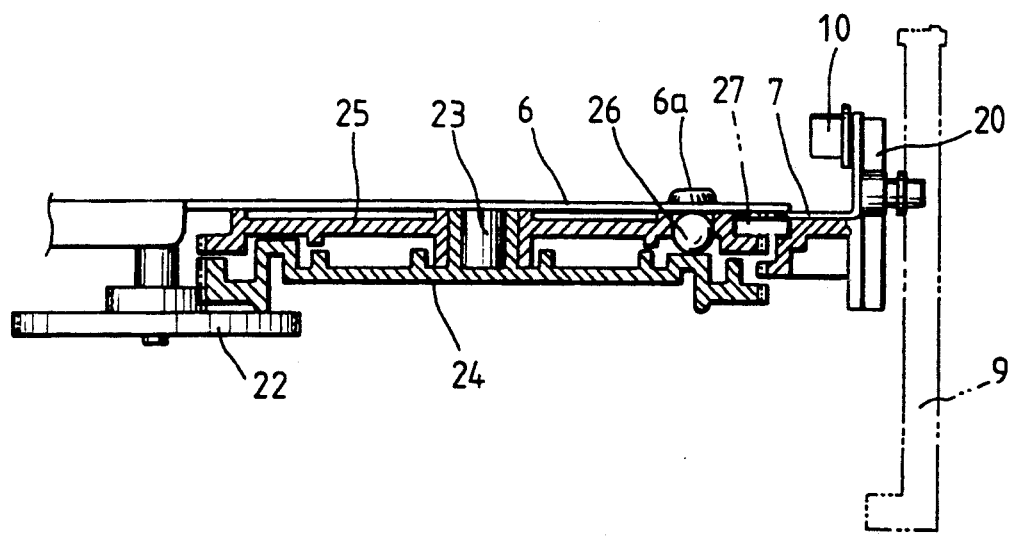
FIG. 10 is a cross-sectional view of FIG. 9.
Figure 9:
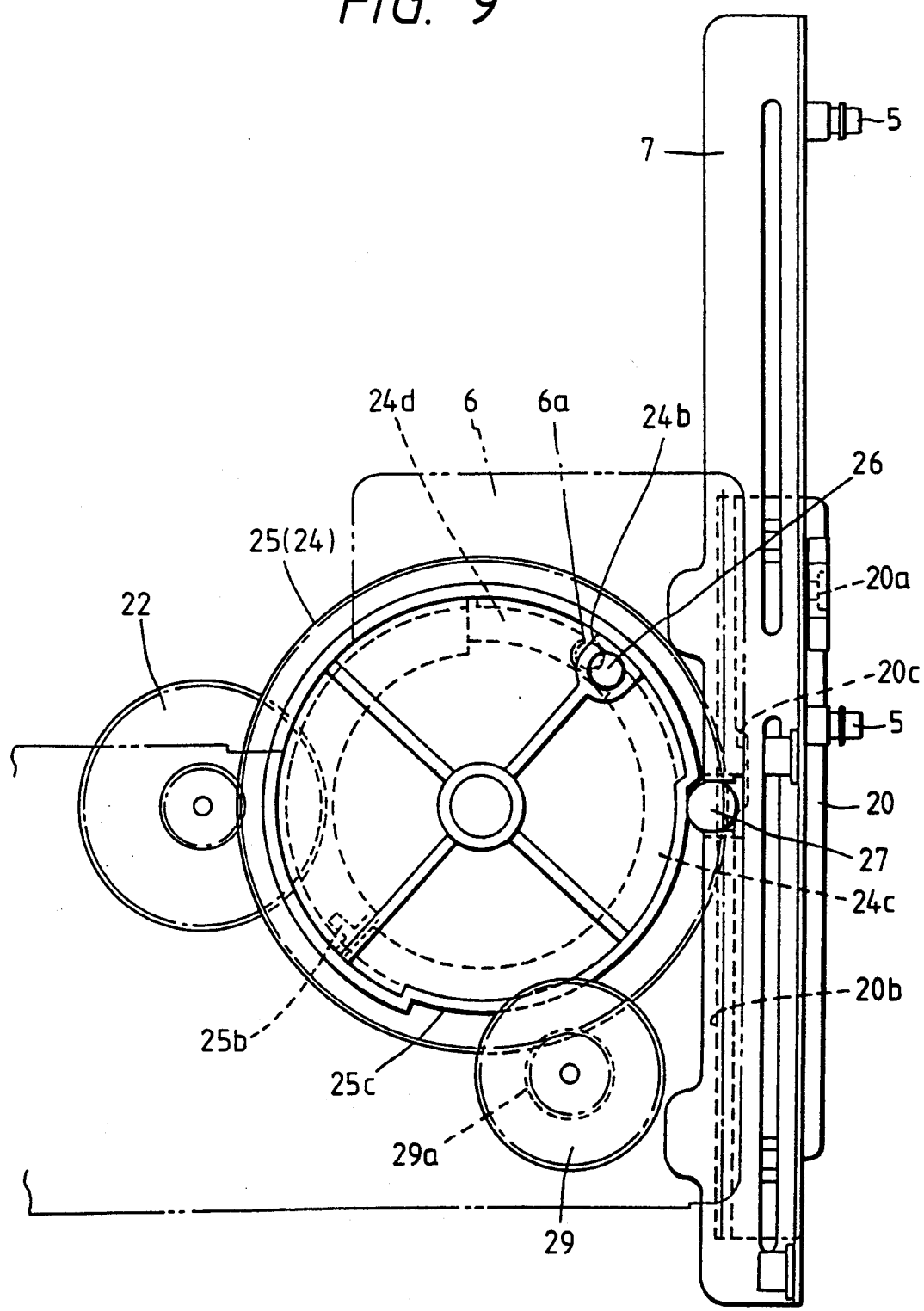
FIG. 9 is a view similar to FIG. 7 but showing the operation of a roller.
Figure 11:
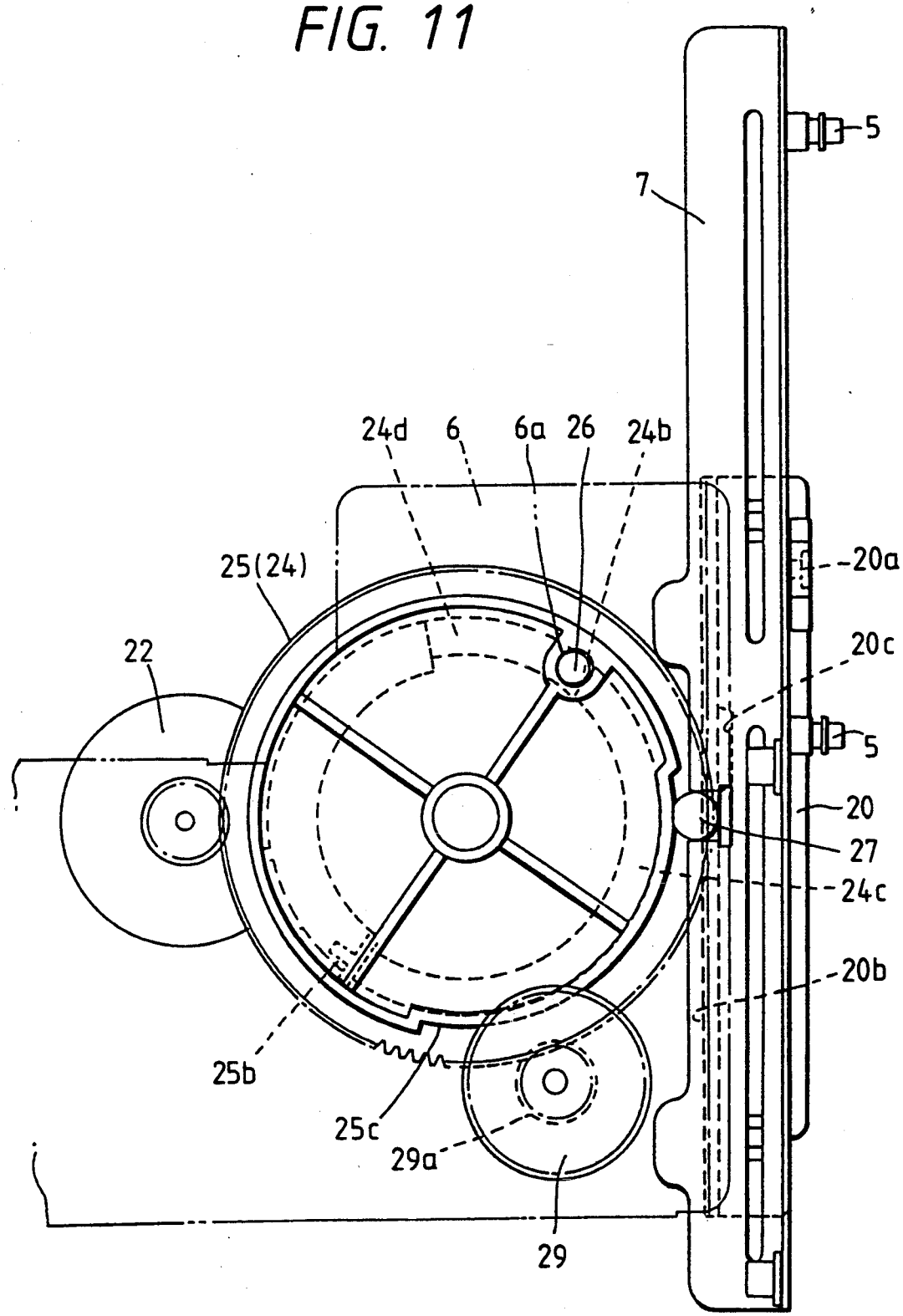
FIG. 11 is a view similar to FIG. 7 but showing the condition in which a carriage is in its retracted position.
Figure 12:
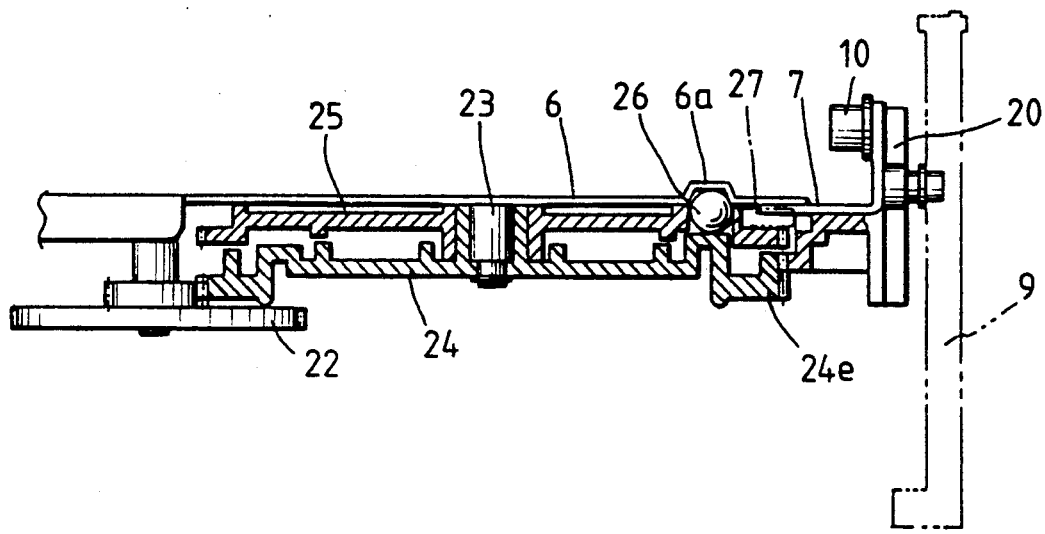
FIG. 12 is a cross-sectional view of FIG. 11.
Figure 14:
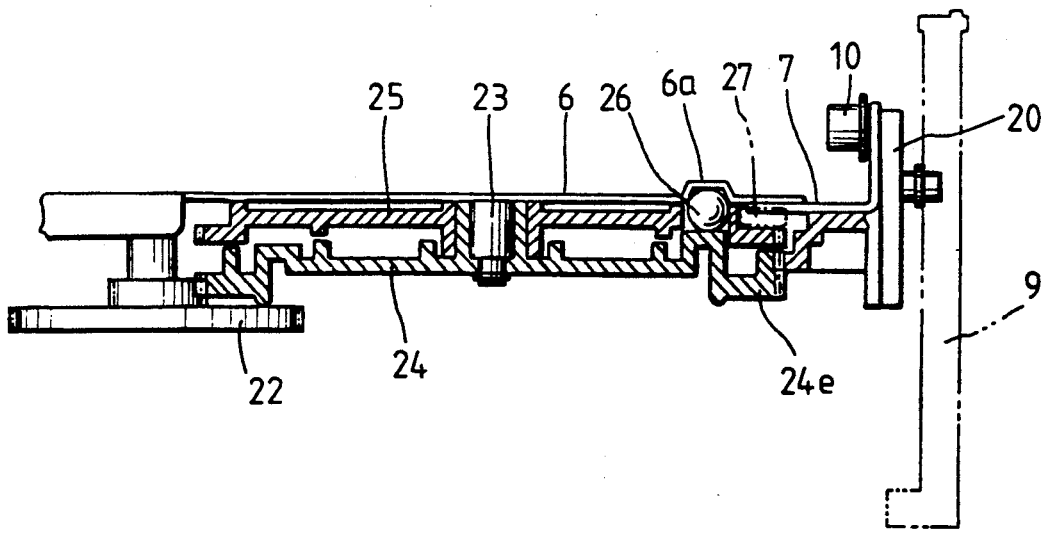
FIG. 14 is a cross-sectional view of FIG. 13.
Figure 13:
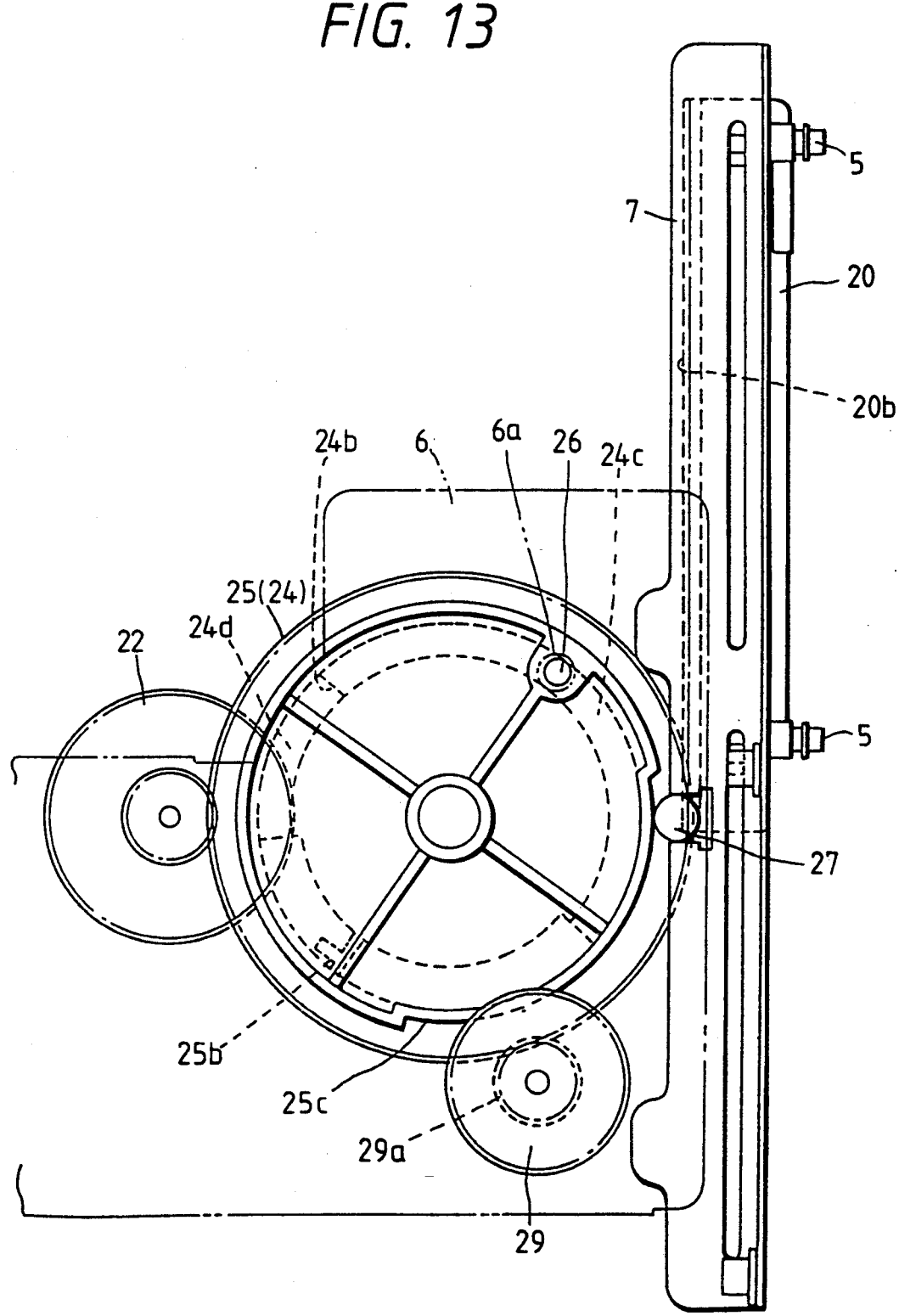
FIG. 13 is a view similar to FIG. 7 but showing the face B-clamping.
Figure 19:
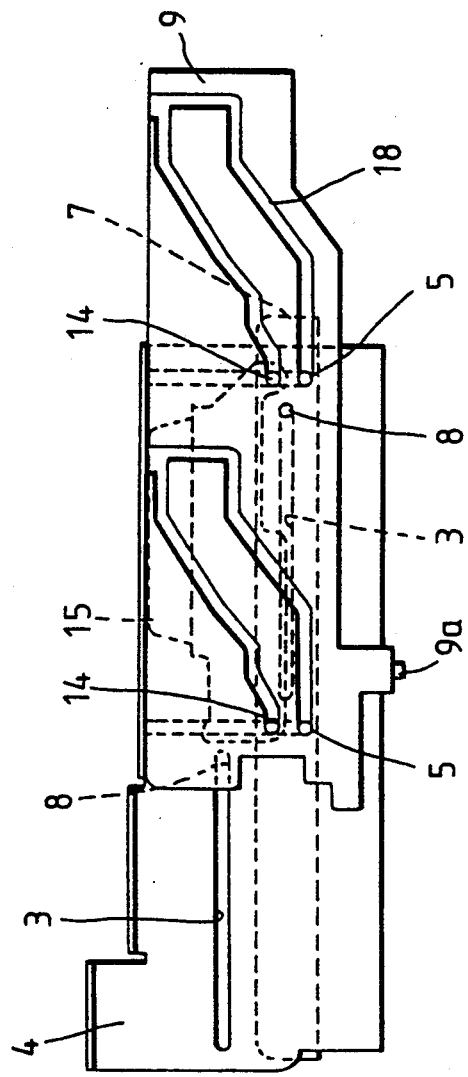
FIG. 19 is a side-elevational view showing the clamp plate 15 at the time of effecting the face B-clamping in connection with FIG. 16.
Figure 20:
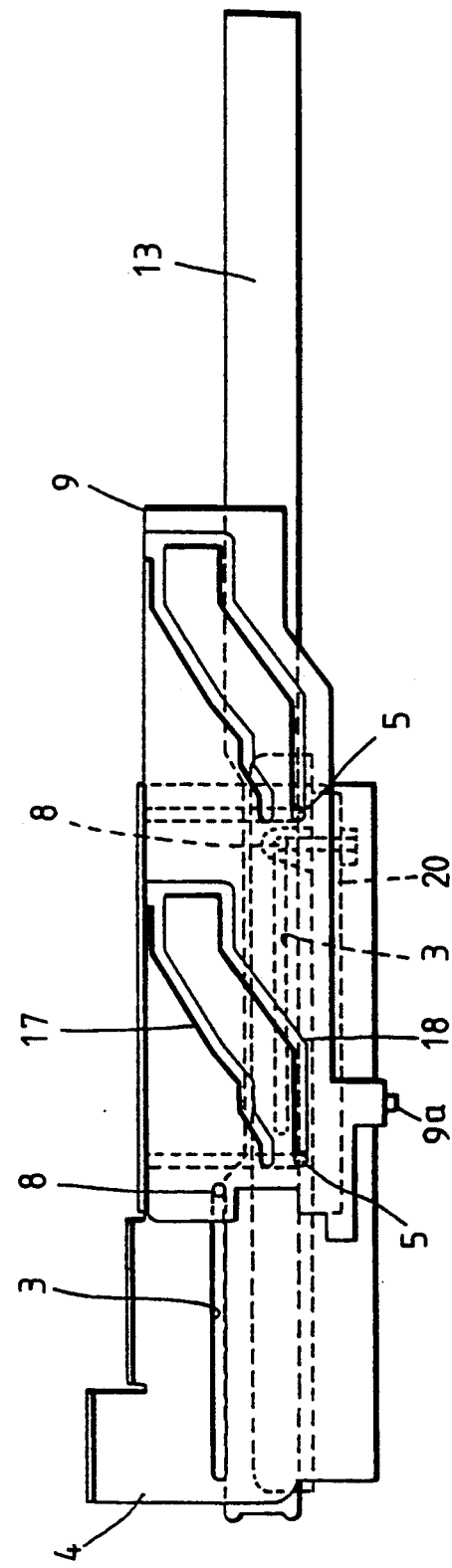
FIG. 20 is a view showing the same condition of FIG. 19 but showing the position of the carriage 13.
Figure 21:
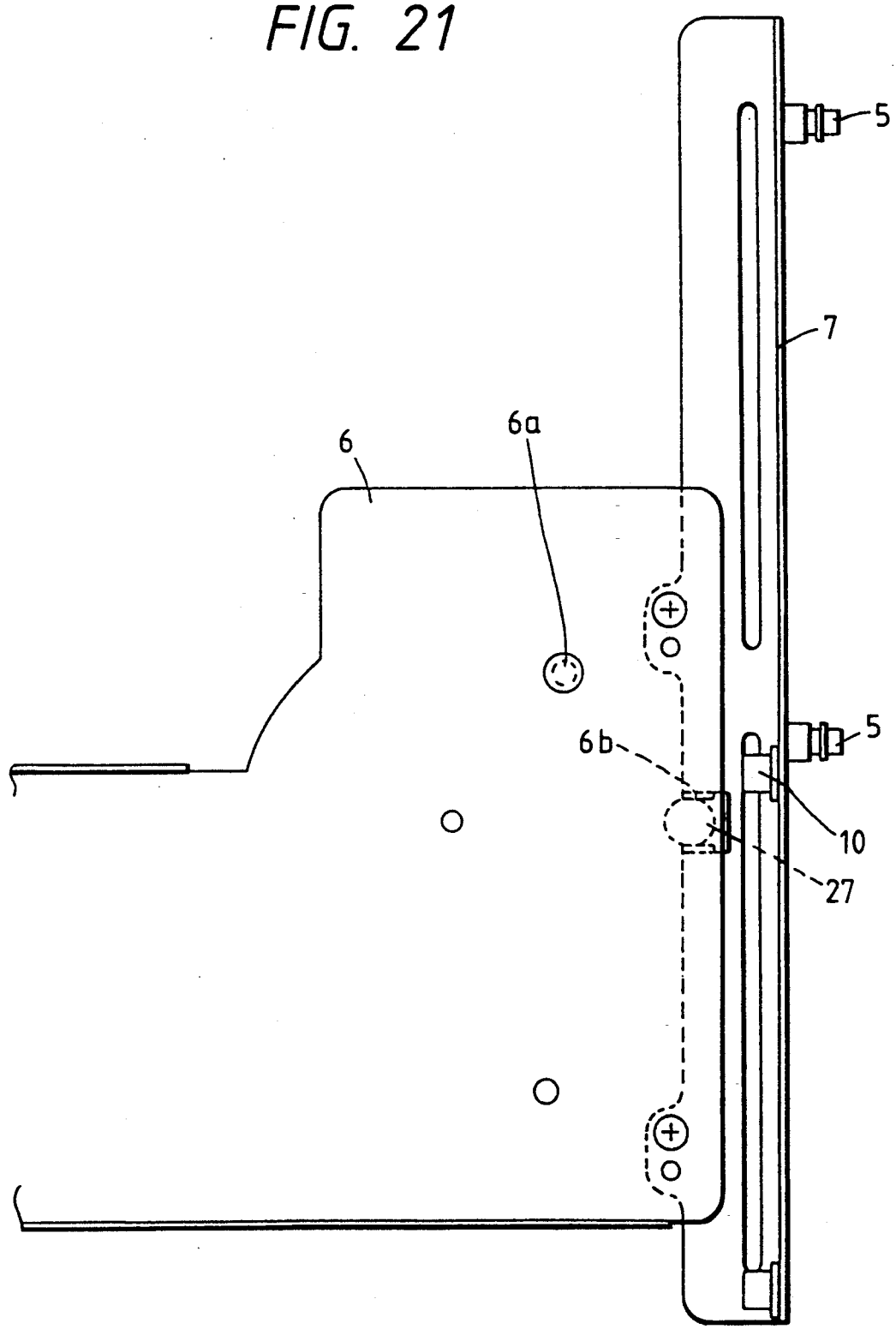
FIG. 21 is a plan view of a motor mounting plate.
Figure 22:
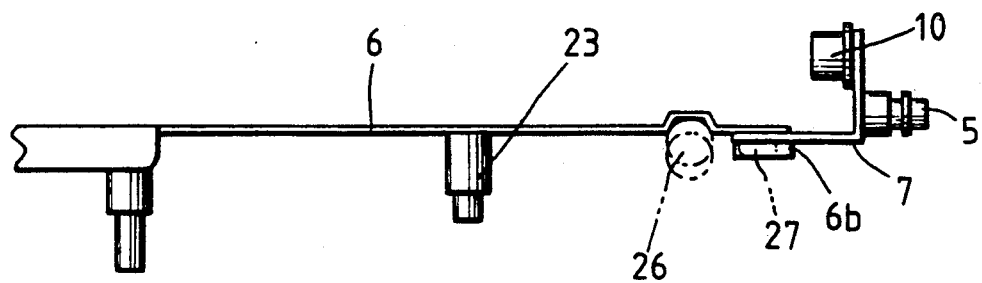
FIG. 22 is a front-elevational view of the motor mounting plate.
Figure 23:
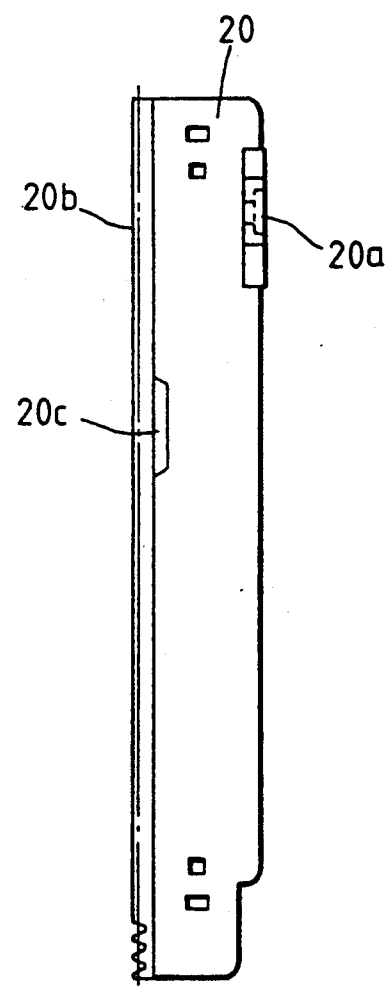
FIG. 23 is a plan view of a rack member.
Figure 24:
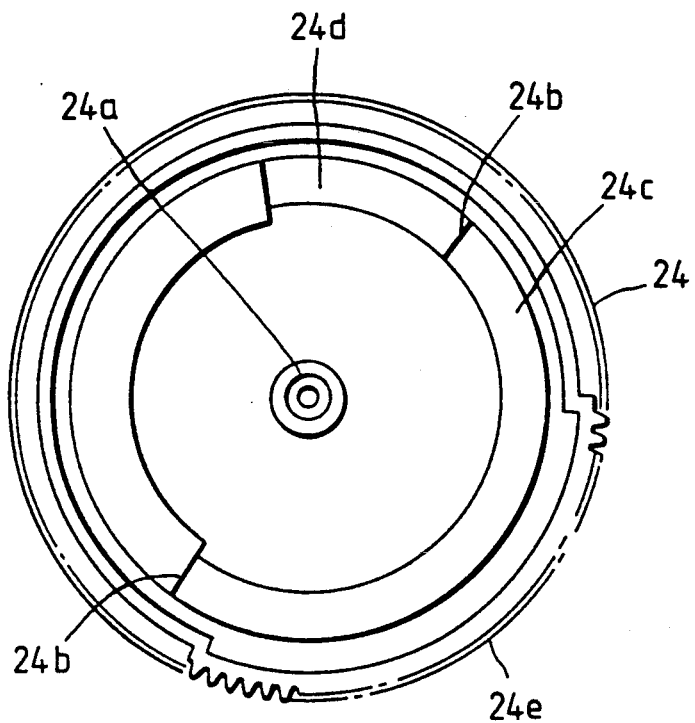
FIG. 24 is a plan view of a gear 24.
Figure 25:
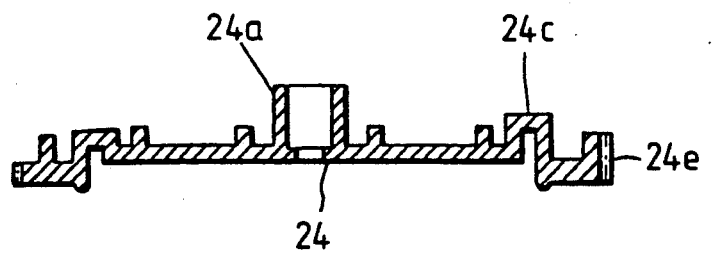
FIG. 25 is a cross-sectional view of the gear 24.
Figure 26:
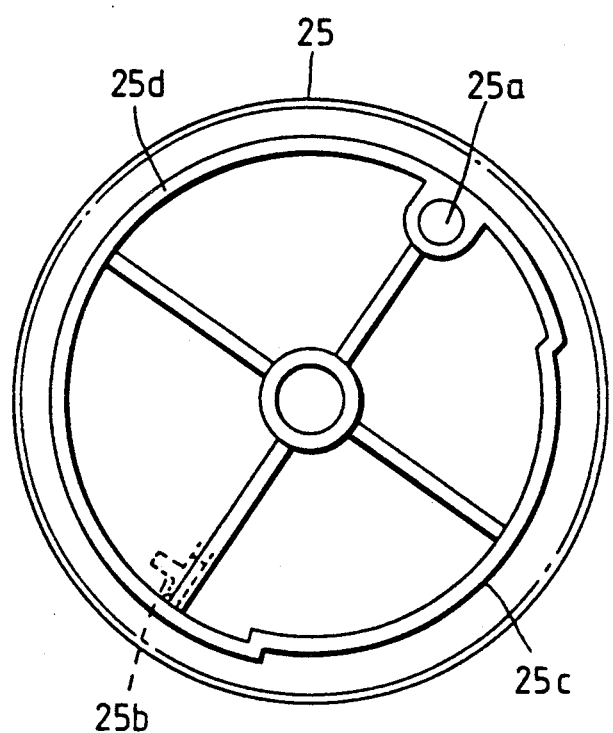
FIG. 26 is a plan view of a gear 25.
Figure 27:
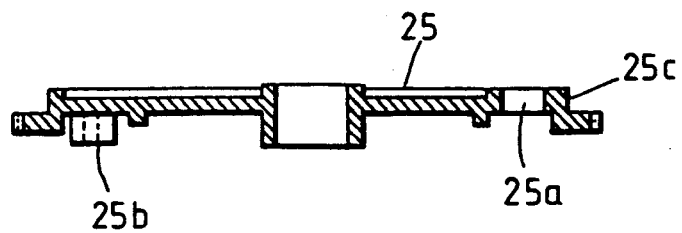
FIG. 27 is a cross-sectional view of the gear 25.

As shown in FIG. 6, a rotatable member 31 is rotatably mounted on the clamp plate 15 by a bearing 30, and a clamper 33 is mounted on the rotatable member 31 for sliding movement upwardly and downwardly, the clamper 33 being urged downwardly by a spring 32.

A centering member 34 is mounted on the rotatable member 31 for sliding movement upwardly and downwardly, the centering member 34 being urged downwardly by a spring 35. The centering member 34 is adapted to be inserted in a center hole of an upper one of the two bonded discs (disc elements) of the video disc 11 so as to center this upper disc.

A turntable 37 is mounted on a spindle 36 for rotation therewith and is adapted to hold the video disc 11 or the compact disc 12 between it and the clamper 33. A centering member 38 is mounted on the turntable 37 for sliding movement upwardly and downwardly, the centering member being urged upwardly by a spring 39. The centering member 38 is adapted to be inserted in a center hole of the lower one of the two bonded discs of the video disc 11 so as to center this lower disc.

In the partial cutaway side view of the clamp plate 15 and turntable 37, the left side illustrates the position of the clamp plate when the lower centering member 34 centers the disc by insertion in the hole of the lower disc (two bonded discs being assumed). In this position the upper centering member 34 is not pushed down into the hole of the upper disc. Nevertheless, the disc is clamped between clamper member 33 and turntable 37. When the clamp plate 15 is further lowered, as shown on the right side of FIG. 6, the vertical position of the disc remains the same, but the two centering members are forced downward whereby the lower centering member moves out of the hole of the lower disc and the upper centering member 34 moves into the hole of the upper disc.

An encoder 40 (FIG. 3) is disposed in facing relation to the lower surface of the gear 24 so as to detect an angle of rotation of the gear 24. The encoder 40 produces signals shown in FIG. 30 in accordance with the angle of rotation of the gear 24.

More specifically, corresponding to the operational positions (shown in FIGS. 28 and 29) determined in accordance with the angle of rotation of the gear 24, "I" indicates the position of exchange of the disc, "II" indicates the position where a sensor 41 later described detects the size of the disc, "III" indicates the standby position of a tray and the stop position of the disc, and "IV" indicates the position where the loading operation is reversed when the reproduction by a pickup (not shown) is changed from the upper one of the two bonded discs to the lower disc.

"V" indicates the position where the clamper 33 downwardly urges the video disc 11 so as to reproduce the lower face of the video disc 11 (this is hereinafter referred to as "face A-clamping"), and "VI" indicates the position where the clamper 33 downwardly urges the video disc 11 so as to reproduce the upper face of the video discs 11 (this is hereinafter referred to as "face B-clamping").

Figure 29:
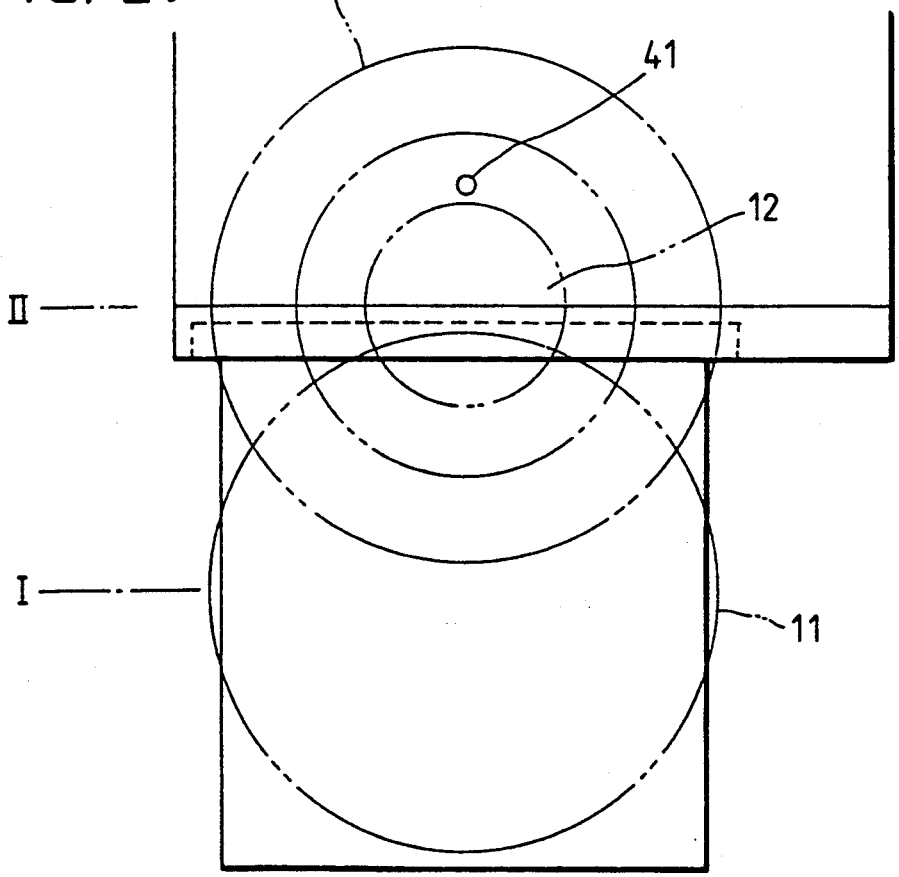
FIG. 29 is a plan view showing the operation of the carriage.

The above-mentioned sensor 41 is mounted on the motor mounting plate 6, and FIG. 29 shows the relation between the above-mentioned position of exchange of the disc and the above-mentioned position of detecting the disc size by the sensor 41.

The operation of the disc loading device of this embodiment will now be described.

Figure 28:
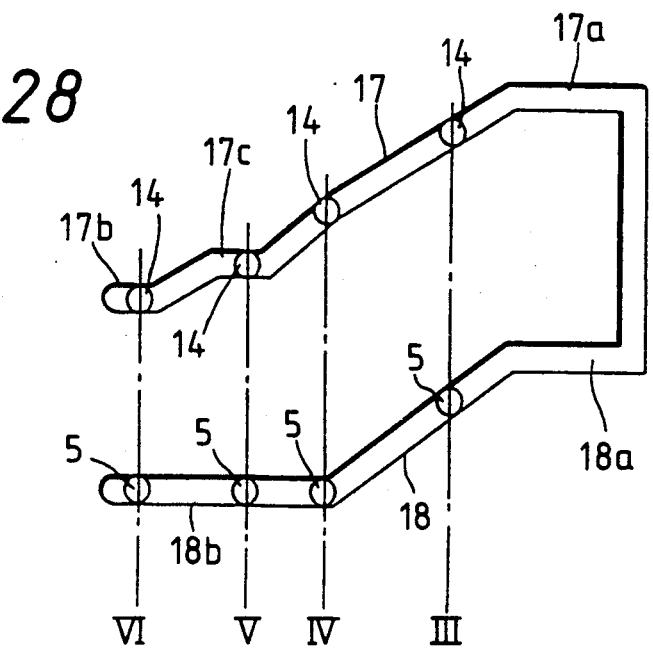
FIG. 28 is a side-elevational view showing the relation between cam slots and pins.

Normally, the pins 5 and 14 received respectively in the cam slots 18 and 17 are disposed at the stop position (III) (FIG. 28).

More specifically, the pin 5 is disposed at a slightly-lower section of the cam slot 18, and therefore the motor mounting plate 6 as well as the carriage 13 is disposed at a slightly lowered position with respect to the guide slot 2.

Also, since the pin 14 is disposed at a slightly-lower section of the cam slot 17, the clamp plate 15 is disposed at a slightly-lowered position with respect to the guide slot 2.

At this time, the carriage 13 is disposed in such a manner that the center of the circular stepped portions 13a coincides with the center of the clamper 33 and hence with the center of the turntable 37 through the meshing engagement between the gear 29 and the rack 28.

Also, the roller 27 is disengaged from the recess 20c of the rack member 20 and is received in the recessed portion 25c of the cam surface 25d, and the wider gear portion 24e of the gear 24 is meshingly engaged with the rack 20b. Therefore, the rack member 20 is slidable in forward and backward directions in accordance with the rotation of the gear 24.

In the above stop position (III) when an ejection instruction is given, the motor 21 is rotated to rotate the gear 24 through the series of gears 22 in the direction opposite to the direction of the arrow A (FIG. 2).

As a result, the wider gear portion 24e of the thus rotating gear 24 drives the rack member 20 through the rack 20b to move the slide plate 9, so that the pins 14 and 5 are displaced to the horizontal portions 17a and 18a of the cam slots 17 and 18, respectively.

Then, since the stepped portion 24b of the gear 24 passes beneath the ball 26, the ball 26 drops on the lower surface 24d, so that the ball 26 is disengaged from the recessed portion 6a of the motor mounting plate 6. This enables the rotation of the gear 25.

At the same time, the other stepped portion 24b of the gear 24 is brought into abutting engagement with the projection 25b of the gear 25 so that the gear 25 is rotated together with the gear 24.

As a result of the rotation of the gear 25, the recessed portion 25c of the cam surface 25d is disengaged from the roller 27 and at this time the recess 20c of the rack member 20 is brought into registry with the roller 27, so that the roller 27 is urged by the cam surface 25d into the recess 20c of the rack member 20 to thereby prevent the rack member 20 from moving.

As a result, the slide plates 9 are also held stationary, and the clamp plate 15 and the motor mounting plate 6 are held at their uppermost positions.

The rotation of the gear 25 is also transmitted to the rack 28 through the gear 29a, disposed in mesh with the gear 25, and the gear 29, so that the carriage 13, disposed at its upper position as a result of the movement of the motor mounting plate 6 to its uppermost position, is moved. As a result, the carriage 13 is moved to the disc exchange position (I) where the video disc 11 or the compact disc 12 can be placed on it.

When the carriage 13 is thus moved to the disc exchange position, the encoder 40 detects the angle of rotation at this time, so that the motor 21 is stopped.

When the carriage 13 is in this disc exchange position (I), the video disc 11 is placed on the carriage 13 (or the compact disc 12 is placed on the stepped portion 13a), and by either giving a loading instruction or pushing the carriage 13 inwardly, the gear 24 is rotated, and the detecting signal of the encoder 40 is switched (see "I" in FIG. 30), so that the motor 21 begins to rotate in the direction which is opposite to the direction of its rotation for effecting the above ejecting operation.

This rotation of the motor 21 is transmitted to the gear 24, so that the gear 24 is rotated in the direction of the arrow A (FIG. 2).

At this time, the ball 26 is held in contact with the stepped portion 24b, and the stepped portion 24b tries to raise or upwardly urge the ball 26, but since the motor mounting plate 6 overlies the ball 26, such upward movement of the ball 26 is prevented.

Therefore, the ball 26 is not raised from the hole 25a, and is kept in engagement with the stepped portion 24b, so that the gear 25 is rotated in unison with the gear 24.

Since the gear 29a is in mesh with the gear 25, the rack 28 in mesh with the gear 29 is driven, so that the carriage 13 is moved in an inward direction of the player.

Figure 30:
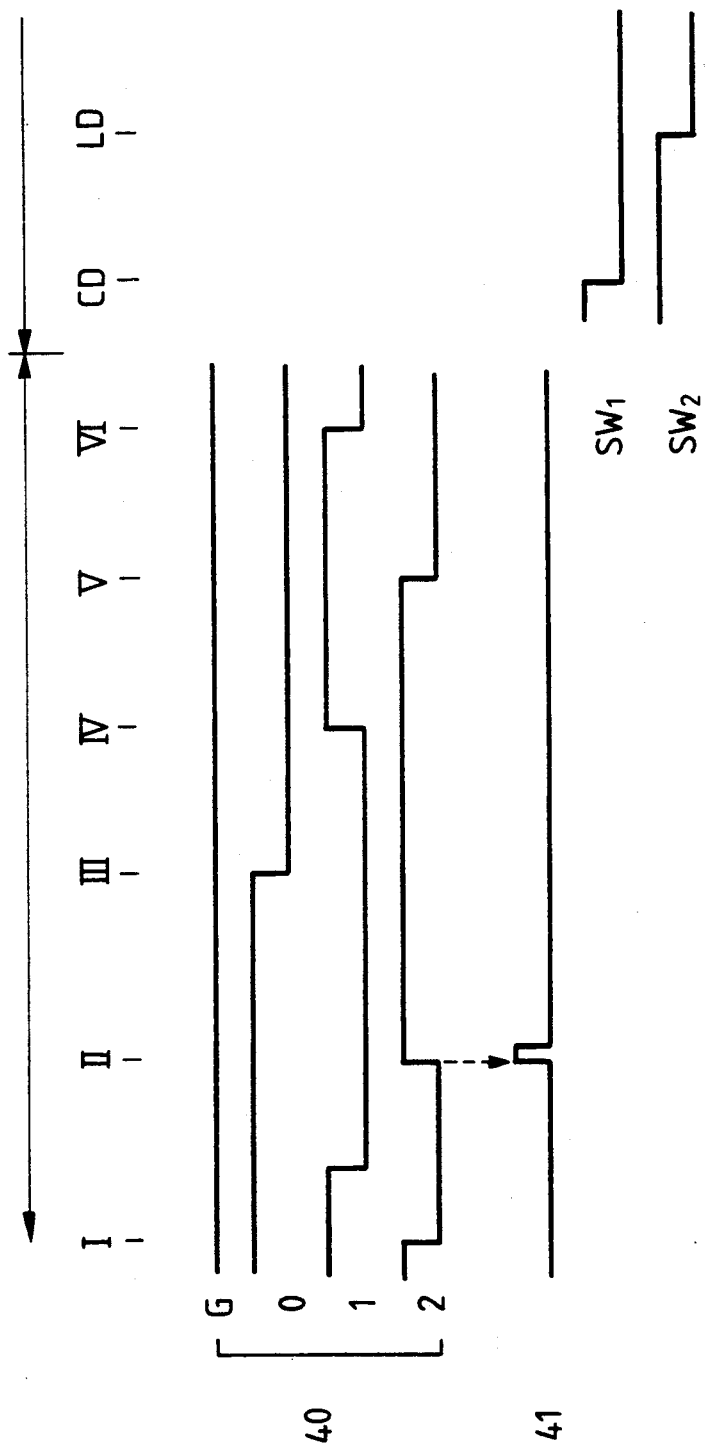
FIG. 30 is a time chart showing the relation between FIG. 28 and FIG. 29.

Then, when the carriage 13 is moved into the disc size-detecting position (II) (FIG. 29), the angle of rotation of the gear 24 at this time is detected by the encoder 40 as shown in FIG. 30, so that the sensor 41 is operated.

When the video disc 11 is placed on the carriage 13, the sensor 41 is operated (ON state) by the reflection of light from the video disc 11, but when the compact disc 12 is placed on the carriage 13, the sensor 41 is in the OFF state since the compact disc 12 does not overlie or cover the sensor 41.

When the sensor 41 is in the ON state, the pickup (not shown) is moved inside of the outer periphery of the video disc 11 through the operation of a switch SW2 (FIG. 30).

When the sensor 41 is in the OFF state, the pickup is similarly moved inside of the outer periphery of the compact disc 12 through the operation of a switch SW1.

By doing so, the time required to start the reproduction of the disc is shortened.

After the disc size is detected in the above manner, the motor 21 continues to rotate, and therefore the operation of the carriage 13 is continued through the gear 29 driven by the gear 25, and the carriage 13 is retracted to the position where the center of the disc on the carriage 13 coincides with the center of the clamper 33.

However, before the carriage 13 reaches this position, the recessed portion 25c of the cam surface 25d of the gear 25 reaches the roller 27.

At the same time, the wider gear portion 24e of rack 20b of the rack member 20 so as to start the movement of the rack member 20.

Therefore, the roller 27 received in the recess 20c is moved out of the recess 20c and is received in the recessed portion 25c of the cam surface 25d, so that the rack 20 is moved through the above-mentioned meshing engagement.

When the center of the disc coincides with the center of the clamper 33 as described above, the ball 26 reaches the recessed portion 6a of the motor mounting plate 6.

Since the ball 26 is urged upwardly by the stepped portion 24b, the ball 26 is disengaged from the stepped portion 24b and is received into the recessed portion 6a.

Therefore, the in-unison or synchronizing movement of the gears 24 and 25 is terminated, and the gear 25 ceases to rotate as a result of the introduction of the ball 26 into the recessed portion 6a, and the gear 24 continues to rotate and therefore continues to move the rack member 20 through its wider gear portion 24e.

In response to the movement of the rack member 20, the slide plate 9 is moved in unison therewith, and the pins 14 received in the cam slots 17 and the pins 5 received in the cam slots 18 descend along the inclinations of the cam slots 17 and 18 respectively.

Then, when the slide plate 9 reaches to the stop position (III) (FIG. 28), the encoder 40 detects this through the angle of rotation of the gear 24 as shown in FIG. 30 to thereby stop the motor 21.

At this time, the carriage 13 descends in response to the descending of the pins 5, and the disc placed on the carriage 13 is disposed at a predetermined position before it is transferred to the turntable 37. And, the clamp plate 15 descends in an amount equal to the amount of descending of the carriage 13, and the clamper 33 does not clamp the disc.

In this stop position (III), when an instruction for reproducing the lower face of the disc (hereinafter referred to as "face A-reproduction") is given, the motor 21 is again rotated in the same direction.

Therefore, the rack member 20 is again moved in the same direction, and the motor mounting plate 6 descends through the pins 5 together with the carriage 13, so that the disc placed on the carriage 13 rests on the turntable 37.

The clamp plate 15 is also lowered through the pins 14, and the clamper 33 is pressed against the upper face of the disc, and at the same time the centering member 38 is inserted in the center hold of the lower disc to effect the face A-clamping.

This face A-clamping is achieved when the pins 14 reach the horizontal portions 17c of the cam slots 17, and at this time, as shown in FIG. 30, the encoder 40 detects this position (V) through the angle of rotation of the gear 24 to stop the rotation of the motor 21.

Then, the pickup (not shown) is focused on to effect the reproduction of the face A of the disc.

The video disc 11 may comprise two discs bonded together, and in this case after the reproduction of the face A is completed, it is necessary to subsequently reproduce the upper face (hereinafter referred to as "face B-reproduction") of the video disc 11. At this time, the face B-clamping is required to correct the eccentricity due to the misalignment of the two bonded discs.

Therefore, when there is given an instruction for reproducing the face B either after the completion of the face A-reproduction or during the face A-reproduction, the motor 21 is rotated in an opposite direction, and therefore the slide plate 9 is moved in a direction opposite to its above-mentioned direction, so that the pins 5 and 14 are moved from the position (V) to the position (IV).

As a result, the encoder 40 detects this as shown in FIG. 30 to stop the motor 21.

During this stop period, the pickup is inverted to be moved to the upper side of the disc and is ready to start the reproduction of the face B.

In the above positions of the pins 5 and 14, the disc is placed on the turntable 37, but the clamper 33 is moved upwardly, and the centering of the disc by the centering member 34 is released.

When the above inverting operation of the pickup is completed as described above, the motor 21 is again rotated in the opposite direction, and therefore the slide plate 9 moves in response to the rotation of the motor 21, so that the pins 14 reach the position (VI), that is, the horizontal portions 17b of the cam slots 17.

More specifically, the height of the pins is lowered, and therefore although the disc is kept placed on the turntable 37, the clamp plate 15 further descends considerably even after the clamper 33 presses the disc against the turntable 37, and the centering member 34 urges the centering member 38 downwardly and is inserted in the center hole of the upper disc to thereby effect the face B-clamping which is the centering of the upper disc.

Then, the pickup is focused on to effect the reproduction of the face B.

If the instruction for reproducing the face B is given from the position (III), the motor 21 is again rotated in the same direction, and the operation is similar to that for the face A-reproduction. However, in this case the relevant parts pass through the position (V) and reach the position (VI), and the encoder 40 detects this as shown in FIG. 30 to stop the motor 21.

In this position (VI), the face B-clamping is effected as described above, and the pickup is focused on to effect the face B-reproduction.

When the instruction is given for the face A-reproduction either during the face B-reproduction or after the face B-reproduction, the motor 21 is rotated in an opposite direction, and the relevant parts are moved from the position (VI) toward the position (IV) in a similar manner as described above for switching the reproduction from the face A to the face B.

The relevant parts are operated to be moved to position (IV) is in a similar manner as described above, and the centering of the disc is released.

Then, when the inverting operation of the pickup is completed, the motor is again rotated in an opposite direction, so that the relevant parts are moved to the position (V), and the above-mentioned face A-clamping and the reproduction of the face A are carried out.

Further, either when the face A-reproduction or the face B-reproduction is completed, or when an instruction for ceasing the reproduction is given, the motor 21 is rotated in an opposite direction to again move the slide plate 9 in an opposite direction. Then, when the relevant parts reach the stop position (III), the clamper 33 is raised to release the clamping of the disc, and the disc is transferred from the turntable 37 to the carriage 13, and the motor 21 is stopped.

Further, in this stop position (III), when the ejection instruction is given, the carriage 13 carries the disc to the disc exchange position (I).

As described above, in the present invention, by operating one slide plate by the drive means, the disc can be transferred from the carriage to the turntable, and also the disc can be clamped relative to the turntable by the clamper.

Further, the upward and downward movement of the clamp plate for effecting the face A-clamping and the face B-clamping is carried out by the movement of the slide plate. Therefore, the mechanism involved is markedly simplified, and low cost and improved reliability can be achieved.

Further, when the clamping is switched from the face B-clamping to the face A-clamping, the carriage is not moved upwardly although the clamp plate is moved upwardly, and it is not necessary to transfer the disc to the carriage. Therefore, even if the rotation of the disc is not stopped completely, this switching operation can be done, and the time required for switching the reproduction from the face B to the face A can be shortened, and besides there is no risk of damaging the disc.

Further, since the carriage is not moved as described above, noises resulting from such movement of the carriage are not encountered.

What is claimed is:

1. A disc loading device for use in a disc reproducing device of the type having a turntable adapted to support thereon a disc having information stored on both faces thereof and rotatable with said disc and a pickup for reading the information from said disc, said loading device comprising:
   a transfer device operatively coupled with said turntable so as to transfer said disc to said turntable;
   a centering device for centering said disc placed on said turntable;
   said centering device including a first centering member mounted on said turntable and a second centering member supported by a clamp device, said clamp device being operatively coupled with said turntable so as to clamp said disc relative to said turntable;
   a cam surface operative engaged with said transfer device, said centering device and said clamp device;
   said cam surface including (i) a first cam portion said clamp device and said transfer device between respective first positions and respective second positions in a synchronizing manner so as to transfer said disc between said transfer device and said turntable; (ii) a second cam portion for moving said clamp device between said second position and a third position so as to cause said clamp device at said third position to clamp said disc relative to said turntable and also to cause said first centering member to engage with said disc so as to center said disc; and (iii) a third cam portion for moving said clamp device between said third position and a fourth position so as to cause said clamp device between said third position and a fourth position so as to cause said clamp device at said fourth position to disengage said first centering member from said disc and engage said second centering member with said disc so as to center said disc; and
   a drive system coupled with said cam surface so as to move said cam surface in accordance with a selected pattern clamp said disc to said turntable and to center said disc selectively with either of said first and second centering members.

2. A disc loading device as claimed in claim 1, wherein said drive system comprises means responsive to a signal representing that the device should position the disc for reading information on the bottom face thereof, when the disc is presently positioned for reading information on the top face thereof, for moving said cam surface in a first direction to cause said clamp device to return from said fourth position through said third position to said second position to release the centering operations of said first and second centering members and the clamping operation of said clamp member, and to further move said cam surface in an opposite direction to cause said clamp device to move from said second position to said third position to clamp said disc relative to said turntable and to cause said first centering member to center said disc.

3. A disc loading device according to claim 1, wherein when said clamp device is in the third position, said pickup is disposed on one side of said disc to read the information stored on said one side face of said disc; and when said clamp device is in the fourth position, said pickup is disposed on the other side of said disc to read the information stored on said other side face of said disc.

4. A disc loading device as claimed in claim 3, further comprising a pickup driver coupled with said pickup so as to move said pickup from a position for reading the information on one face of said disc to a position for reading the information on the other face of said disc when said clamp device is moved by said cam surface between said third and fourth positions.

5. A disc loading device comprising a stationary side plate having vertical guides and horizontal guides formed thereon; a clamp plate capable of being guided by said vertical guides so as to move upwardly and downwardly, said clamp plate having a first centering member adapted to be engaged with a first center hold of an upper one of two bonded discs when said claim plate is in a first position, said clamp plate also having a clamper for pressing against the upper face of the disc; a carriage engaged with said vertical guides so as to be guided by said vertical guides so as to transfer the disc, placed on said carriage, to a turntable when said carriage is moved downwardly; a slide plate engaged with said horizontal guides, said slide plate being driven by a drive so as to move forwardly and backwardly; a first cam slot formed in said slide plate so as to downwardly move said clamp plate in two steps; a second cam slot formed in said slide plate so as to downwardly move said carriage; a second centering member mounted on said turntable so as to be engaged with a second center hole of the lower one of said two bonded discs when said clamp plate is in a second position.

6. A disc loading device for a disc reproducing apparatus of the type having a turntable adapted to support a disc thereon, a carriage positioned so as to transfer a disc to said turntable, and a clamper positioned so as to clamp said disc to said turntable; said disc loading device comprising:

a first disc centering member disposed on said turntable for centering the bottom face of said disc on said turntable and a second disc centering member disposed on said clamper for centering the top face of said disc on said turntable;

a cam plate movable in a backward and forward direction and having cam slots formed therein;

cam follower pins positioned to follow said cam slots; said pins being connected to said carriage and said clamper; and a driver coupled to said cam plate so as to move said cam plate in specified directions for specified distances to cause said follower pins to move said carriage and said clamper means in an up and down direction to selectively position said disc on said turntable, clamp said disc, and center said disc using said first centering member when said clamp plate is in a first position and second center member when said clamp plate is in a second position.

7. A disc loading device as claimed in claim 6, further comprising a stationary side plate having horizontal and vertical slots; said follower pins passing through said vertical slots to limit movement thereof to an up and down direction; and fixed pins passing through said horizontal slots connected to said cam plate, and being driven by said motor and gearing means to move said cam plate in the forward and backward direction.

* * * * *